May 8, 1951     O. GUENSCHE     2,552,316
MICROMETER CALIPER ATTACHMENT
Filed Feb. 8, 1946
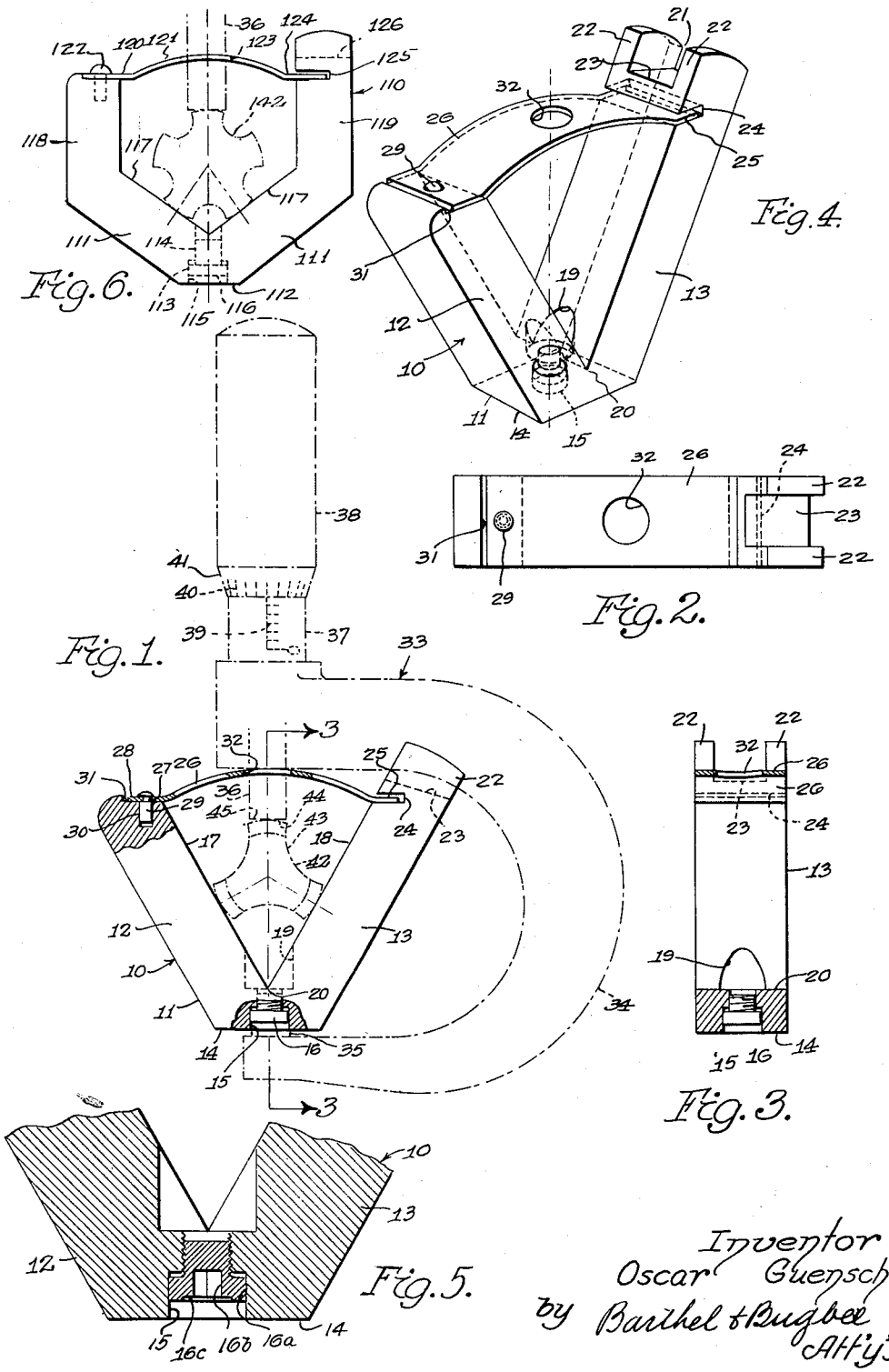

Patented May 8, 1951

2,552,316

UNITED STATES PATENT OFFICE 2,552,316

MICROMETER CALIPER ATTACHMENT

Oscar Guensche, Detroit, Mich.

Application February 8, 1946, Serial No. 646,264

11 Claims. (Cl. 33—167)

This invention relates to measuring devices and in particular to devices for measuring the dimensions of fluted articles, such as taps, reamers, or the like, particularly those with an odd number of flutes.

One object of this invention is to provide an adapter for standard micrometer calipers which is capable of measuring the dimensions of fluted articles which cannot be conveniently measured by the ordinary micrometer caliper, yet which can be quickly and easily attached to and detached from the micrometer caliper, leaving the latter free for the ordinary type of measurement.

Another object is to provide an adapter for standard micrometer calipers consisting of a V-shaped member having a socket at one end for fitting over the anvil of a standard micrometer caliper, a slotted arm engaging the frame of the caliper, and a spring member fitting over the micrometer spindle and releasably holding the adapter in position, whereby a fluted article placed between the arms of the V-shaped member can be measured by bringing the spindle into contact therewith and the measurement translated into accurate figures by a simple computation.

Another object is to provide an adapter for standard micrometer calipers as set forth in the foregoing objects, wherein a set of such adapters is provided, one of these adapters being suitable for the minimum of three-fluted articles, another with a different angle between the arms being provided for measuring five-fluted articles, and so forth, different sizes of adapters being also provided for different sizes of calipers, whereby a workman can have his micrometer calipers free for the usual and ordinary types of measurement without the need for providing special calipers for fluted workpieces, yet provide means whereby such fluted work pieces may be measured merely by selecting one of these adapters from the set, snapping it into the appropriate size of caliper, making the measurement, and by a simple computation, immediately determining the dimensions desired, after which the adapter is snapped out of the caliper and the latter again freed for the ordinary type of measurement.

Other objects and advantages of the invention will become apparent during the course of the following description of the accompanying drawing, wherein:

Figure 1 is a side elevation, partly in section, of a measuring device according to a preferred form of the invention, with certain portions in section to more clearly disclose the construction and with the micrometer caliper shown in dotted lines;

Figure 2 is a top plan view of the measuring device shown in Figure 1;

Figure 3 is a vertical section along the line 3—3 in Figure 1;

Figure 4 is a perspective view of the measuring device shown in Figure 1;

Figure 5 is an enlarged detail sectional view of the lower portion of Figure 1; and Figure 6 is a side elevation of a modification of the measuring device shown in Figure 1, as applied to the measurement of five-fluted articles.

Referring to the drawings in detail, Figure 1 shows the measuring device of this invention, generally designated 10, as consisting of V-shaped member 11 having arms 12 and 13 interconnected at their base 14, the latter having a countersunk socket 15 tapped with a fine instrument thread into which is threaded a correspondingly threaded adjusting screw 16 with an accurately machined flat head 16a (Figure 5) for engaging the anvil of a micrometer caliper as hereinafter described. The screw 16 engages the threaded socket 15 with a friction fit so as to bind somewhat and prevent accidental turning. It is provided with a wrench socket 16b for adjustment purposes, the head 16a being relieved as at 16c to lessen the central head area in order to increase the accuracy of engagement with the micrometer caliper anvil.

The arms 12 and 13 are provided with inner surfaces 17 and 18 arranged at an appropriate angle to one another, this angle being 60°, for example, for measuring three-fluted articles. At their junction, the arms 12 and 13 are provided with a socket 19 extending to the line 20 at which the surfaces 17 and 18 meet. The upper end of the arm 13 is provided with a longitudinal slot 21 providing arms 22 on either side of a bottom wall 23. Below the slot 21, the arm 13 is provided with an oblique transverse slot 24 which is of sufficient size and width to loosely receive the free end 25 of a curved spring 26 having a hole 27 in the end 28 thereof for receiving a fastener 29 inserted into a socket 30 in the end of the arm 12. The end 28 of the spring 26 is secured in a recessed portion 31 of the upper end of the arm 12 and the spring 26 is provided with a central aperture 32.

The device is used in connection with a standard micrometer caliper 33 having the usual U-shaped frame 34 with an anvil 35 at one end and a spindle 36 extending through the other end in alignment with the anvil 35. The spindle 36 is rotatably mounted in a barrel 37 and is connected to the usual micrometer screw (not shown) threaded through the barrel 37 and in turn connected to a thimble 38 telescoping over the barrel 37. The barrel 37 is provided with graduations 39 cooperating with graduations 40 on the bevelled portion 41 of the thimble 38.

In operation, the proper micrometer caliper 33 is selected for the particular fluted tool 42 to be measured and the spindle 38 screwed backward into the barrel 37. The corresponding adapter 10 is then selected and snapped into place with the slot 21 engaging the frame 34, the socket 15 fitting over the anvil 35 and the aperture 32 aligned with the spindle 36. The latter is then screwed down through the aperture 32 and the device is ready for taking measurements upon a three-fluted tool.

Let it be assumed that the bottom of the socket 19, which is aligned with the junction 20 in the surfaces 17 and 18, is 0.200 inch from the anvil contact surface of screw 16 in the socket 15, this being a constant of the adapter. The fluted tool 42 is placed in the adapter as shown in Figure 1, and the spindle 36 screwed down into contact with the lands thereof as in the ordinary use of the micrometer caliper. The reading is then taken from the scales 39 and 40 in the usual manner. From this indicated measurement, the constant of the adapter is subtracted, namely 0.200 inch, since the zero of the caliper is now actually at 0.200 inch. Let it be assumed that the indicated measurement is 0.500 inch, whereupon the actual measurement is 0.300 inch, taking into account the shifted position of the zero. This actual dimension is now multiplied by two-thirds, in order to obtain the true diameter of the tool 42, which in the above example gives us 0.200 inch as the true diameter. The two-thirds factor arises from the trigonometry of the arrangement (Figure 1).

In practice it is contemplated that a set of adapters will be sold for use with a set of standard micrometer calipers covering the ranges 0 to 1 inch, 1 inch to 2 inches, 2 inches to 3 inches, and so forth. With the aid of this adapter, the need for special micrometer calipers is dispensed with or for calipers with special graduations 39 and 40, as previously used. Instead, the regular graduations 39 and 40 are used, and the conversion made by the simple arithmetical operations described above. Thus, the standard micrometer caliper may be used at any time for the large majority of work, and the adapter 10 snapped into place for the occasional measuring job requiring its use.

The modification shown in Figure 6 is similar in principle to that shown in Figures 1 to 5 inclusive, but is especially adapted to measuring the diameters of articles with five flutes, such as taps, reamers or the like. This device, generally designated 110, consists of angled arms 111 interconnected as at 112 and having a recessed socket 115 with a threaded bore 114 for receiving an instrument screw 113 with a very accurately machined flat head 116. The threaded bore 114 and screw 113 are provided with extremely fine instrument threads having a relatively tight fit or binding fit so that the screw 113, when once adjusted, will not turn easily but still permitting such adjustment, when desired.

The angled arms 111 have accurately machined inner surfaces 117 inclined at an included angle of 108 degrees. The arms 111 are provided with extensions 118 and 119, the extension 118 having the end 120 of a curved spring 121 secured thereto as at 122 and having an aperture 123 therein for the passage of the spindle 36 of the micrometer caliper 33 (Figure 1). The free end 124 of the curved spring 121 engages a transverse slot 125 in the extension 119 and the latter is provided, at its end, with a longitudinal slot 126 for engaging the frame 34 of the micrometer caliper 33, as described in connection with Figure 1. The adjusting screw 113 is also provided with a centrally recessed head, as described in Figure 1.

In the operation of the modification shown in Figure 6, the device 110 is snapped into place with the slot 126 engaging the caliper frame 34 and with the socket 115 fitting over the anvil 35, the latter engaging the end 116 of the adjusting screw 113, and the aperture 123 aligned with the spindle 36, as described in connection with Figure 1. The device is now ready for use.

While I have shown and described my invention in detail, it is to be understood that the same is to be limited only by the appended claims, for many changes may be made without departing from the spirit and scope of my invention.

What I claim is:

1. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, supporting portion on said member for gripping the frame of said caliper, and a resilient positioning element on said member for engaging the spindle of said caliper.

2. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, supporting portion on said member for gripping the frame of said caliper, and a resilient positioning element extending from one arm of said member into engagement with the other arm thereof, said positioning element having a locating portion thereon engaging the spindle of said caliper.

3. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, supporting portion on said member for gripping the frame of said caliper, and a spring element secured to one arm of said member and extending to the other arm thereof, said spring element having a locating portion thereon engaging the spindle of said caliper.

4. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, supporting portion on said member for gripping the frame of said caliper, and a spring element secured to one arm of said member and extending to the other arm thereof, said spring element having a locating aperture closely encircling the spindle of said caliper.

5. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, supporting portion on said member for gripping the frame of said caliper, and a spring element secured to one arm of said member and extending into a cavity in the other arm thereof, said spring element having a locating aperture closely encircling the spindle of said caliper.

6. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, one arm of said member having a recess engageable with the frame of said caliper, and a resilient positioning element on said member for engaging the spindle of said caliper.

7. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, one arm of said member having a recess engageable with the frame of said caliper, and a resilient positioning element on said member for engaging the spindle of said caliper, said positioning element extending from one arm of said member to the other arm thereof.

8. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, one arm of said member having a recess engageable with the frame of said caliper, and a resilient positioning element on said member for engaging the spindle of said caliper, said positioning element extending from one arm of said member into a cavity in the other arm thereof.

9. An adapter for measuring the diameters of fluted tools and instantly attachable to and detachable from an unaltered standard micrometer caliper comprising a V-shaped member having obliquely disposed intersecting arms with angled precision inner surfaces for receiving and engaging the lands of the tool and a socket disposed in the outer surface of said member substantially at the point of intersection of said arms and extending inwardly therefrom for receiving the anvil of said caliper, one arm of said member having a recess engageable with the frame of said caliper, and a resilient positioning element on said member for engaging the spindle of said caliper, said positioning element extending from one arm of said member into a cavity in the other arm thereof and including a locating aperture closely encircling the spindle of said caliper.

10. An adapter for measuring the diameters of fluted tools in a standard micrometer caliper comprising a V-shaped member having angled precision inner surfaces for receiving the tool and a socket for receiving the anvil of said caliper, supporting portion on said member for gripping the frame of said caliper, said socket having a threaded bore therein, and an adjusting screw threaded into said bore with the top of its head within said socket for engagement by the anvil of said caliper.

11. An adapter for measuring the diameters of fluted tools in a standard micrometer caliper comprising a V-shaped member having angled precision inner surfaces for receiving the tool and a socket for receiving the anvil of said caliper, supporting portion on said member for gripping the frame of said caliper, said socket having a threaded bore therein, and an adjusting screw threaded into said bore with the top of its head within said socket for engagement by the anvil of said caliper, the central area of the head of said adjusting screw being recessed below the level of the head surface thereof whereby to effect engagement in the peripheral zone and prevent rocking of the anvil of said head.

OSCAR GUENSCHE.

REFERENCES CITED

The following references are of record in the file of this patent:

UNITED STATES PATENTS

| Number | Name | Date |
|---|---|---|
| 1,499,730 | Hanson | July 1, 1924 |
| 2,332,229 | Jelley | Oct. 19, 1943 |

FOREIGN PATENTS

| Number | Country | Date |
|---|---|---|
| 392,091 | Germany | Mar. 15, 1924 |
| 667,185 | France | May 20, 1930 |